(12) United States Patent
Wang

(10) Patent No.: US 6,970,295 B1
(45) Date of Patent: Nov. 29, 2005

(54) OPTICAL BEAM EXPANDER WITH A FUNCTION OF LASER POWER DETECTION

(75) Inventor: Chi-Luen Wang, Hsin Chu (TW)

(73) Assignee: Leadlight Technology, Inc., Taoyuan (TW)

( * ) Notice: Subject to any disclaimer, the term of this patent is extended or adjusted under 35 U.S.C. 154(b) by 0 days.

(21) Appl. No.: 10/867,664

(22) Filed: Jun. 16, 2004

(51) Int. Cl.[7] .............................................. G02B 27/14
(52) U.S. Cl. ...................... 359/629; 359/618; 359/634
(58) Field of Search ................................ 359/629, 618, 359/634; 369/53.1, 53.35

(56) References Cited

U.S. PATENT DOCUMENTS 5,991,016 A * 11/1999 Irie .............................. 356/233
6,181,431 B1 * 1/2001 Siu .............................. 356/502
2002/0191177 A1 * 12/2002 Ulrich et al. ................ 356/218
2005/0041705 A1 * 2/2005 Chien et al. ............. 372/38.01

* cited by examiner

Primary Examiner—Hung Xuan Dang
Assistant Examiner—Joseph Martinez
(74) Attorney, Agent, or Firm—Troxell Law Office, PLLC N

(57) ABSTRACT

An optical beam expander with a function of laser ray power detection provides an electric signal for feedback controlling laser ray power. By testing the power stability within a temperature range of 15 to 25° C., this apparatus demonstrates that it can stabilize an unstable laser to stable range of 5% when combined with a traditional self-controlling circuit arrangement.

5 Claims, 2 Drawing Sheets

OPTICAL BEAM EXPANDER WITH A FUNCTION OF LASER POWER DETECTION

BACKGROUND OF THE INVENTION

1. Field of the Invention

The present invention relates to an optical beam expander with a function of laser power detection, and more particularly to an optical beam expander for increasing the stability of the laser ray power generated from a self-controlling power circuit without increasing the size of the optical beam expander.

2. Description of the Prior Art

In general, the laser diode is used to receive light leakage generated from a rear face of thereof by using a photodiode and feeding back the light current to the self-controlling power circuit so as to control the stability of the output light. However, an unstable laser ray power sometimes occurs due to the variable proportion of the backward output light and the forward output light. A large laser places a beam splitter and photodiodes at the front of the light-passing opening to transform a portion of the laser ray power into light current so as to control the laser ray power. A large laser is able to provide a more stable laser ray power; however, it has a large volume because of the extra devices added.

A diode-pump solid-state green laser usually contains an optical beam expander because it has a smaller diameter and a large divergence angle for expanding the laser beam and reducing the degrees of the divergence angle. Because the laser backward light is extremely weak and contains infrared components, it is not possible to control the laser ray power like the laser diode.

SUMMARY OF THE INVENTION

The primary object of the present invention is to provide an increasing stability of the laser ray power without increasing the size of the optical beam expander.

For achieving the object stated above, the traditional optical beam expander is modified by disposing a beam splitter and photodiodes in the original space to increase the function of the detection of the laser ray power. An optical beam expander with a function of laser power detection having an optical detector and a beam splitter reflects a portion of laser ray to the optical detector for detecting the laser ray power.

To provide a further understanding of the invention, the following detailed description illustrates embodiments and examples of the invention, this detailed description being provided only for illustration of the invention.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Figure 1:
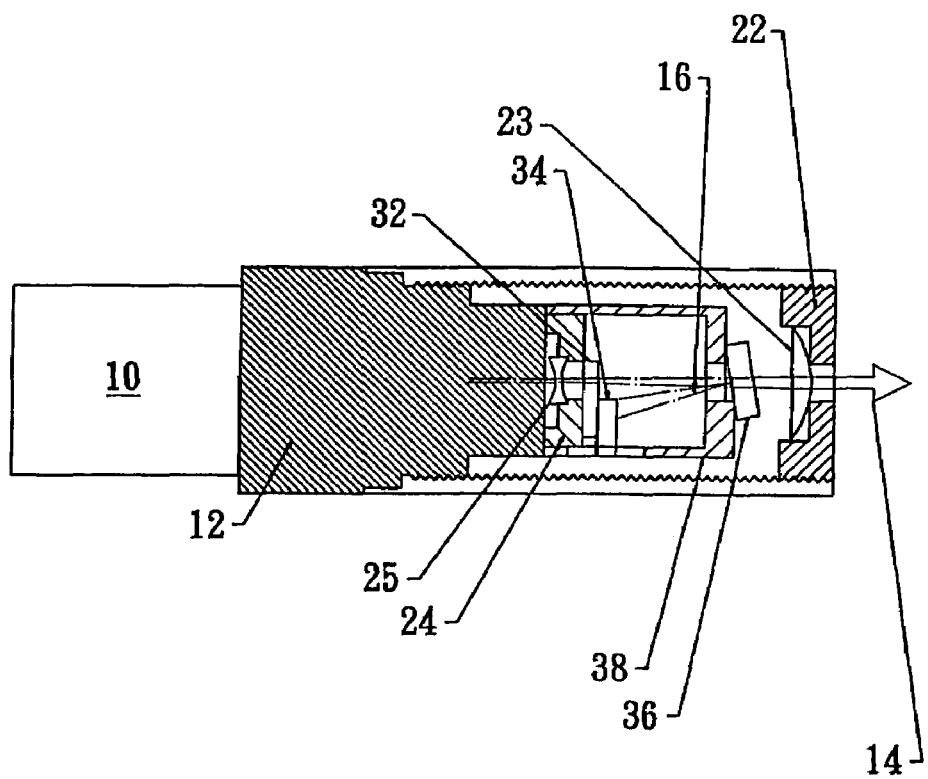
FIG. 1 is a schematic view of the present invention.

Reference is made to FIG. 1, which is a schematic view of the present invention. The optical beam expander includes a concave lens 25, a convex lens (23), an infrared cut-off filter (32), a beam splitter (36) and a photodiode (34). A laser ray (such as an optical detector) passes along an emitting direction through the concave lens (25) to enlarge the beam of light and passes through the convex lens (23) to decrease the divergence angle of the laser ray (14). The infrared cut-off filter (32) is used to filter the infrared components of the laser ray (14). A surface of the beam splitter (36) is uncoated and the reflection rate is about 8% thereof. The coating is used to change the reflection rate and adjust the angle of the beam splitter (36) to reflect the light along a reflected direction into the photodiode (34) and generate the light current. The light current is fed back to the self-controlling power circuit so as to control the stability of the output light. A reflecting angle (16) located between the emitting direction and the reflecting direction is less than 45 degrees, as shown in FIG. 1.

The optical beam expander includes a printed circuit board (10) connected to a green laser (12) that emits the laser ray (14). A focus modulation screw (22) selectively moves the convex mirror (23) within a cylindrical housing of the optical beam expander. The concave lens (25) is located in a concave lens holder (24). The beam splitter (36) is located in a beam splitter holder (38). The convex lens (23) and the concave lens (25) define a lens set. The printed circuit board has a self-controlling power circuit.

Figure 2:
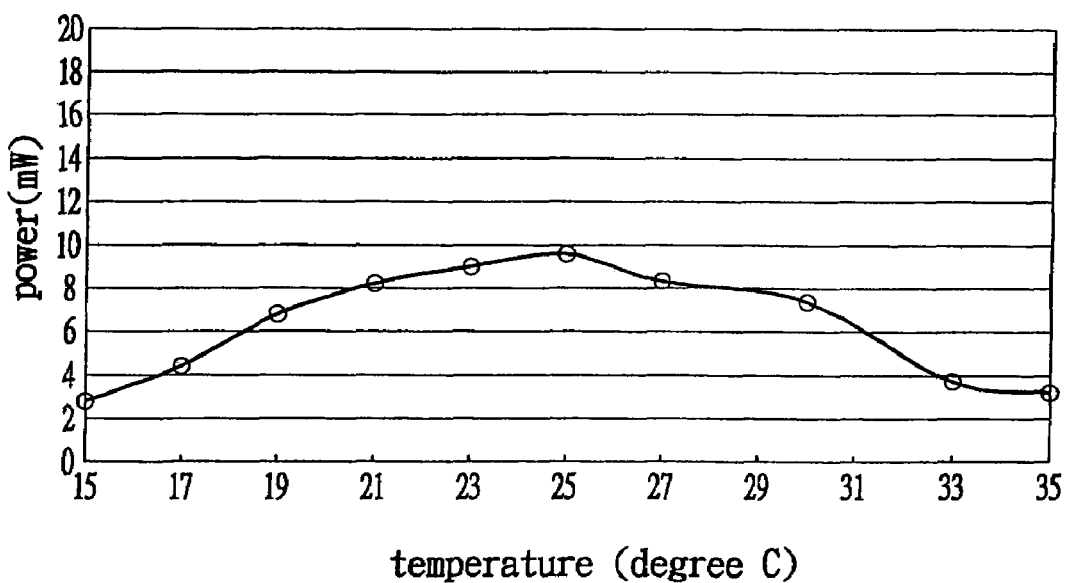
FIG. 2 is a graph showing sets of curves relating to the temperature dependence of the traditional fixed current-controlled green laser ray power.

FIG. 2 is a graph showing sets of curves relating to the temperature dependence of the traditional fixed current-controlled green laser ray power. The optimal situation of the laser ray power is at 25° C.; the laser ray power decreases obviously due to the increase or decrease of the temperature at 25° C. Moreover, the situation of the laser ray power is less stable by about 20% when tested for a long time at room temperature.

Figure 3:
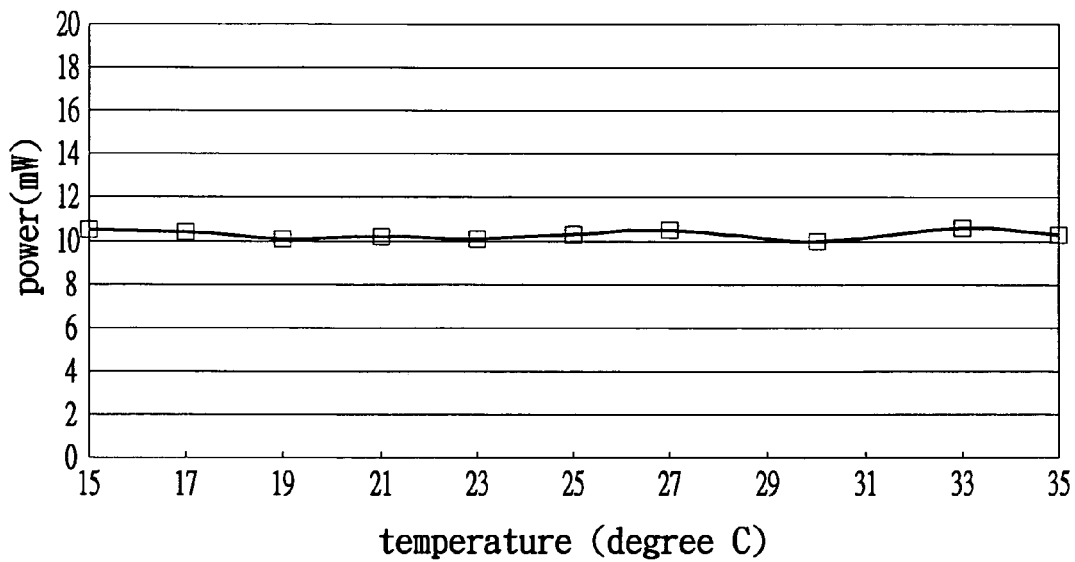
FIG. 3 is a graph showing sets of curves relating to the temperature dependence of the laser ray power generated by adding extra self-controlling power circuit arrangement.

FIG. 3 is a graph showing sets of curves relating to the temperature dependence of the laser ray power generated by adding extra self-controlling power circuit arrangement. The varying range of the laser ray power at a temperature in the range of 15 to 35° C. is ±5%.

Figure 4:
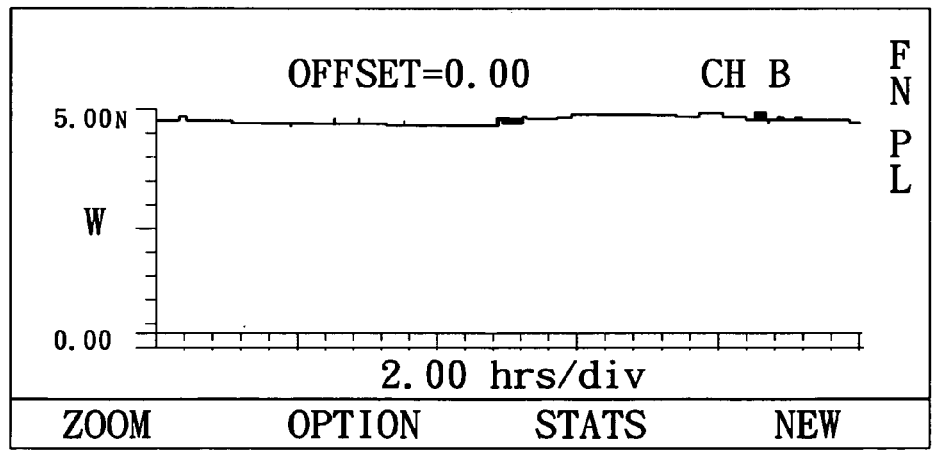
FIG. 4 is a graph showing sets of curves relating to the temperature dependence of the laser ray-power when tested for less than 50 hours at room temperature.

FIG. 4 is a graph showing sets of curves relating to the temperature dependence of the laser ray power when tested for less than 50 hours at room temperature; the stability of the laser ray power is about 5%.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An optical beam expander with a function of laser power detection comprising:
   a) a cylindrical housing;
   b) a lens set located in an interior of the cylindrical housing and having a concave lens and a convex lens;

c) a beam splitter located between the concave lens and the convex lens; and d) an optical detector located between the concave lens and the beam splitter and detecting a laser ray power of a part of a laser ray reflected by the beam splitter to the optical detector, wherein a reflecting angle between an emitting direction of the laser ray and a reflecting direction of the part of the laser ray is less than 45 degrees.

2. The optical beam expander as claimed in claim 1, wherein the beam splitter has a beam splitter surface defined as a smooth coating surface or a smooth uncoated surface, and a reflecting rate of the smooth coating surface or the smooth uncoated surface is between about 0.1 and 99%.

3. The optical beam expander as claimed in claim 2, wherein a reflecting angle of the beam splitter surface is between about 0.1 and 89.9 degrees.

4. The optical beam expander as claimed in claim 1, wherein a wavelength of the partial laser ray is between that of ultraviolet and infrared.

5. The optical beam expander as claimed in claim 1, wherein the optical detector is a device for transforming an optical signal into an electric signal.

\* \* \* \* \*